United States Patent [19]

Harke

[11] Patent Number: 4,773,794
[45] Date of Patent: Sep. 27, 1988

[54] INJECTION ANCHORS FOR PLACEMENT IN PRE-DRILLED HOLES

[75] Inventor: Alfons Harke, Affligem-Hekelgem, Belgium

[73] Assignee: International Intec Co., Liechtenstein, Fed. Rep. of Germany

[21] Appl. No.: 26,252

[22] Filed: Mar. 16, 1987

[30] Foreign Application Priority Data

Mar. 15, 1986 [DE] Fed. Rep. of Germany ....... 3608775

[51] Int. Cl.$^4$ .......................... E21D 20/02; E04B 1/38
[52] U.S. Cl. .................................. 405/260; 405/259; 52/704
[58] Field of Search ............... 405/259, 260, 261, 262; 52/704, 743, 744

[56] References Cited

U.S. PATENT DOCUMENTS

| | | | |
|---|---|---|---|
| 1,564,947 | 12/1925 | Copeman | 52/704 |
| 3,108,404 | 10/1963 | Lamb | 52/704 |
| 3,395,625 | 8/1968 | Blanchette et al. | 405/259 |
| 4,001,989 | 1/1977 | Fischer | 52/704 |
| 4,096,672 | 6/1978 | Fischer et al. | 52/704 |
| 4,253,781 | 3/1981 | Fischer et al. | 405/260 |
| 4,322,183 | 3/1982 | Ciavatta | 405/260 |
| 4,413,929 | 11/1983 | Kigawa et al. | 405/260 |
| 4,461,600 | 7/1984 | Norkus et al. | 405/260 |
| 4,487,528 | 12/1984 | Skoberg | 405/259 |

FOREIGN PATENT DOCUMENTS

| | | | |
|---|---|---|---|
| 134379 | 3/1985 | European Pat. Off. | 405/260 |
| 3138610 | 4/1983 | Fed. Rep. of Germany | 405/260 |
| 564654 | 7/1975 | Switzerland | 405/260 |
| 848663 | 7/1981 | U.S.S.R. | 405/260 |

*Primary Examiner*—Carl D. Friedman
*Assistant Examiner*—Michael Safavi
*Attorney, Agent, or Firm*—Antonelli, Terry & Wands

[57] ABSTRACT

An injection anchor designated for masonry or the like consists of a tube (1) closed at its rear end and of an elastically expandable jacket (2) that surrounds the tube.

In order produce an injection anchor as a reasonably priced mass production article, the tube (1) is provided with a number of diametrically opposing, rounded-off indentations (9, 10) and the elastic jacket (2) is designed as a hose, which extends over the entire length of the tube (1), the ends of the hose being tucked into the tube ends and clamped solidly to the tube (1) by means of rivet-like fasteners (5, 6).

11 Claims, 4 Drawing Sheets

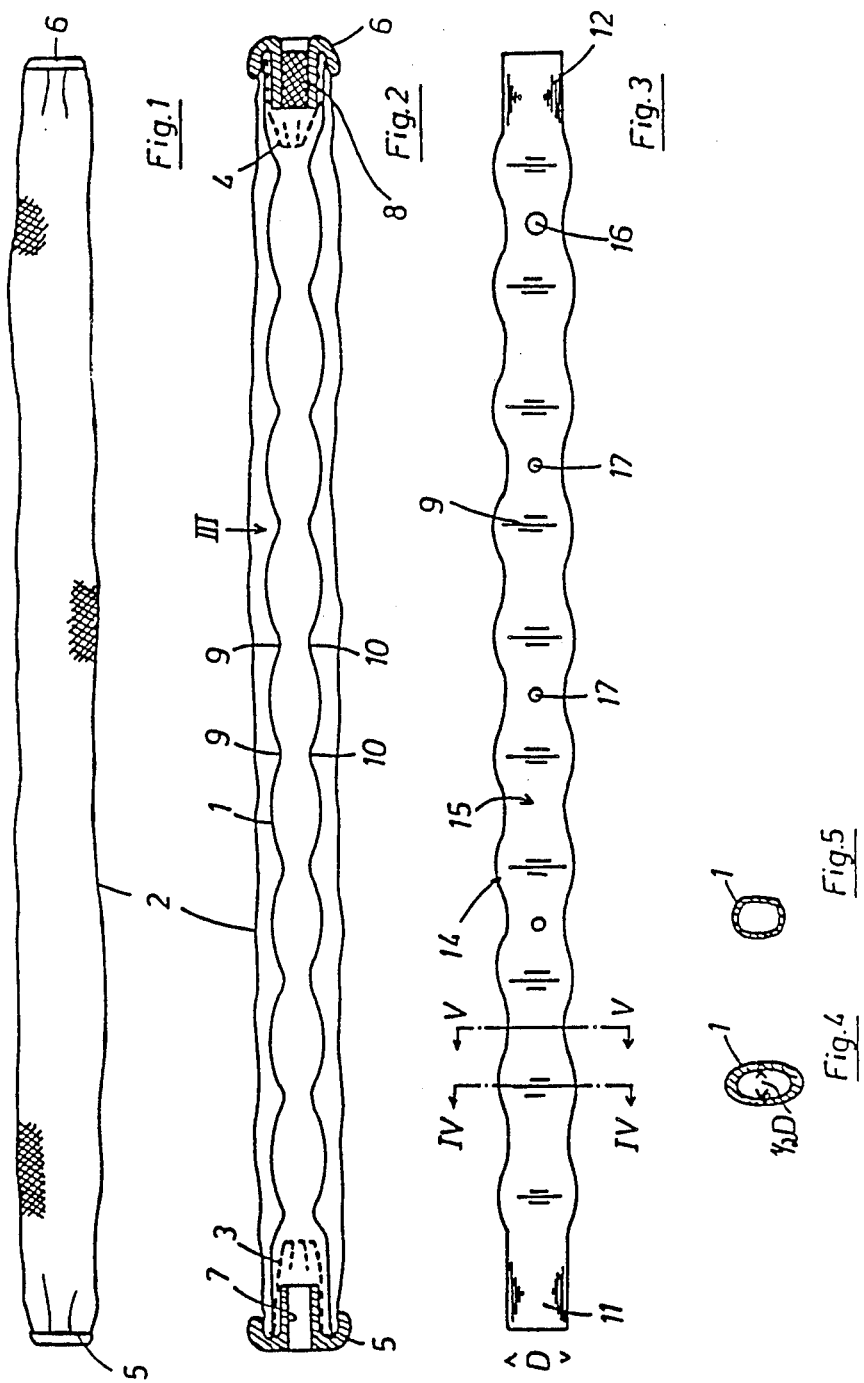

INJECTION ANCHORS FOR PLACEMENT IN PRE-DRILLED HOLES

BACKGROUND OF THE INVENTION

The present invention related to an injection anchor adapted to be placed in pre-drilled holes, with the anchor including a tube having a closed end and provided with at least one radial exit hole for injection material and an elastic jacket for enclosing the tube.

In, for example, Bebrauchsmuster 70 24 434 an injection anchor is proposed including a smooth-walled tube provided with round or elongated hole-like exit holes for enabling an injection of the injection material, whereby a reinforcing wire is wound around the tube, with the reinforcing wire being fixed by rings surrounding the tube and connected with the tube. On one portion of a length the tube and/or protective casing thereof, an elastic jacketing—for example, hollow block stones or ventilated bricks—prevent the injection material from creeping uncontrolled into hollow cavities. However, the proposed injection anchor is, due to a multi-part construction thereof, relatively expensive to produce and cumbersome to handle. When the proposed injection anchor is slid into a drill hole, the external jacket slips, so that it loses a blocking or locking function with respect to the hollow spaces on the masonry side. Additionally, the resistance of the smooth-walled tube to an extraction from the injection stopper is very limited.

Other injection anchors have been proposed which include a solid material rod, having either a drilled injection canal or capillary tubes running adjacent an outside of the anchor rod. However, a disadvantage of the proposed injection anchors resides in the fact that they are relatively expensive to produce.

The aim embodying the present invention essentially resides in providing an injection anchor capable of being mass produced at a reasonable price, as well as an injection anchor which is easy to handle and has a high resistance to extraction—, with regard to both the whole injection stopper from the pre-drilled borehole as well as in terms of pulling the tube out of the injection stopper.

In accordance with the present invention, the tube is provided with diametrically opposed rounded-off indentations over an entire length thereof, and includes alternating flat-oval cross-sectional areas and substantially rounded cross-sectional areas, with an elastic jacket being shaped as a hose extending over a length of the tube, and with the elastic jacket being tucked in at each of its ends into the tube ends and solidly clamped to the tube by, for example fastening members.

In accordance with the present invention it is possible to manufacture the anchor out of only a few parts, such as, for example, for the tube, cross-cut pieces of commercial tubes and for the elastic jacket, cross-cut hose pieces can be used, with the jacket advantageously including a textile fabric or weave that can be expanded to a certain extent. The tube and jacket are securely attached to one another using simpler, rivet-like fasteners, so that the jacket cannot slip when inserted into a borehole. When the injection material is being injected, the jacket is pressed against the drill hole wall, while the injection material passes through the jacket having a limited permeability for the injection material, so that an adhesive bond is achieved with the borehole wall. The jacket thereby bulges out in a formed hollow cavities so that the injection stopper is held in a form-closed manner in the masonry or a like material.

Because of the many indentations in the tube, the tube is seated in a form-closed manner in the injection stopper formed on the inside and outside of the tube, so that the tube itself has a high resistance to extraction. Through the indentations, the tube experiences an outward distension of the material so that the undulating tube does not re-deform, even under high tension loads. The injection anchor may consequently be manufactured as an inexpensive mass-production article in lengths of up to several meters and with diameters of several centimeters, such as, for example, five centimeters, and is foolproof in terms of handling and use.

According to the invention, the tube, in an area of the opposed indentations, is reduced to about one-half a diameter thereof and the tube is continuously undulated avoiding sharp edges. With such an arrangement, localized capacity loads are avoided when traction or thrust loads are brought to bear, so that the danger of breaking the tube or the injection stopper is prevented.

Advantageously, on both ends the same rivet-like fasteners are used which have a passage channel in which the locking piece is pressed into the rear fastener, which, consequently, improves the solid clamping of the tucked-in hose end to the tube.

According to the present invention, at the front end of the anchor the tucked-in hose is provided with an end section extending into the tube by a shaft portion of the fastener which functions as a back-pressure valve when laying aside the injection device and which prevents the injection material from escaping.

According to further features of the present invention the tube is provided at a back end thereof with a larger exit or discharge hole and smaller exit holes distributed over a length thereof. By this arrangement, it is ensured that, on the one hand, the injection material exits into the borehole space near the back end of the injection anchor and gradually fills the borehole space from back to front, and on the other hand, with particularly quick-setting injection materials, it is ensured by virtue of the provision of small holes in the front that the entire borehole space is filled with injection material.

In accordance with still further advantageous features of the present invention, a positioning gasket is clamped between the rivet head of each fastener and the tube ends, with the positioning gasket being adapted to a diameter of the borehole. By virtue of the provision of the positioning gasket a coaxial alignment of the injection anchor to the borehole is ensured.

It is also possible in accordance with the present invention to provide connector posts that are adapted to be plugged into the tube of the injection anchor, and a front portion having a with the connector post being, for example an external screw thread. The connector posts are inserted into the tube prior to a complete hardening of the injection material and a protruding end of the connector post can be used in a manner appropriate to its structure as a hook, eyelet, etc. for reinforcing or suspending other structural pieces.

A further advantage of the present invention is that the tube may be undulated in at its front end, the fastener may be inserted into the tube with high clamping force and its shaft may be provided with an inner thread bore. This allows for mass production of anchors having a highly stable fit of the fastener on the tube, so that the tensile strength with which the fastener can be extracted from the tube, using an appropriate tool, is equal to or somewhat greater than the minimum extraction resistance of the injection anchor. Therefore it is possible to test the extraction resistance of the injection anchors by withdrawing the front fastener from the tube to ascertain whether the injection anchors have prescribed extraction resistance.

In another embodiment of the present invention the tube of the injection anchor may be provided, with diametrically opposed, rounded-off indentations so that the tube has alternating flat-oval cross-sectional areas and substantially round cross-sectional areas over the length of the tube excluding the end sections. The tube jacket may be constructed as a longitudinally elastic hose or sock which is secured on one end to the insertion end of the tube and on the other end is secured to a shrouding ring displaceably mounted to a front segment of the tube.

The injection anchor of the present invention can be inserted either completely into a borehole or left protruding out to a predetermined extent where its end may be used for connecting further elements such as, for example, attachment to a bracket.

BRIEF DESCRIPTION OF THE DRAWINGS

FIG. 1 is a plan view of an injection anchor according to the present invention, FIG. 2 is a longitudinal sectional view of an injection anchor according to the present invention, FIG. 3 is a plan view of the tube of the injection anchor, seen in FIG. 2 in the direction of arrow III, FIG. 4 is a sectional view taken along line IV—IV in FIG. 3, FIG. 5 is a sectional view taken along line V—V in FIG. 3.

Figure 6:
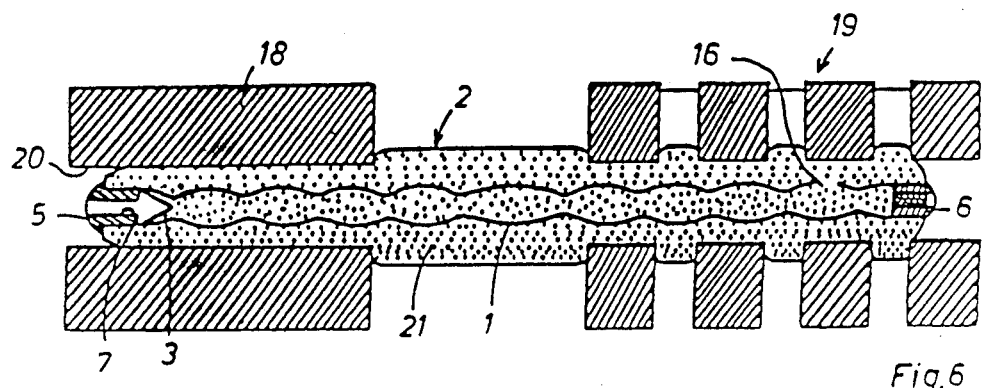
FIG. 6 is a longitudinal sectional view of the application of the injection anchor in a two-sheeted work of masonry.

The injection anchor shown in FIGS. 1 through 5 consists of a tube 1 and an elastic jacket 2 extending over the entire length of the tube, the jacket ends 3, 4 being tucked into the tube ends and solidly clamped to the tube by means of rivet-like fastener elements 5, 6. The rivet-like fasteners each have a passage channel 7 and there is a locking piece 8 pressed rigidly into the passage channel of the rear fastener.

Tube 1 may be constructed of a steel tube of for example 10 millimeters diameter and 1 millimeter wall thickness. Over the length of the tube 1 at regular intervals opposite, rounded-off indentations 9, 10 are provided so that the tube has an alternately flat-oval cross-sectional area 14 according to the cross-section illustration from FIG. 4, and a substantially round cross-sectional area 15 according to the cross-section illustration from FIG. 5. End sections 11, 12 of tube 1 are left with a round cross sectional area. In the area of the indentations 9, 10, the tube is reduced to about one-half the tube's diameter D. The indentations are provided in such a way that the tube is continuously undulated. Near the rear end of tube 1, a large radial exit hole 16 is provided, and over the rest of the length of tube 1 several comparatively small exit holes 17 are provided.

FIG. 6 provides a view of the use of the injection anchor according to FIGS. 1 through 5. Boreholes 20 are pre-drilled into masonry consisting of two shells 18, 19 into which the injection anchor is slid. Injection material is pressed through the passage channel of the front rivet-like fastener 5, first filling the interior space of the tube 1 and then moving radially outward through the exit bores 16 and in some cases through the exit bores 17, thus expanding elastic jacket 2, until it encounters the borehole wall or bulges out into hollow cavities. Relatively quick-setting injection materials are used, so that there is a small reflux pressure after the injection device is laid aside. The elastic jacket's end segments 3 which are turned all the way up by the front fastener 5 further block off the passage channel 7 to prevent reflux in the manner of back-pressure valve. After the injection material hardens, the bulges in the hollow cavities make up injection material stoppers (one shown at 21), which are held in a form-closing manner to the masonry shells 18, 19 and provide the anchor with a high resistance to extraction.

Figure 7:
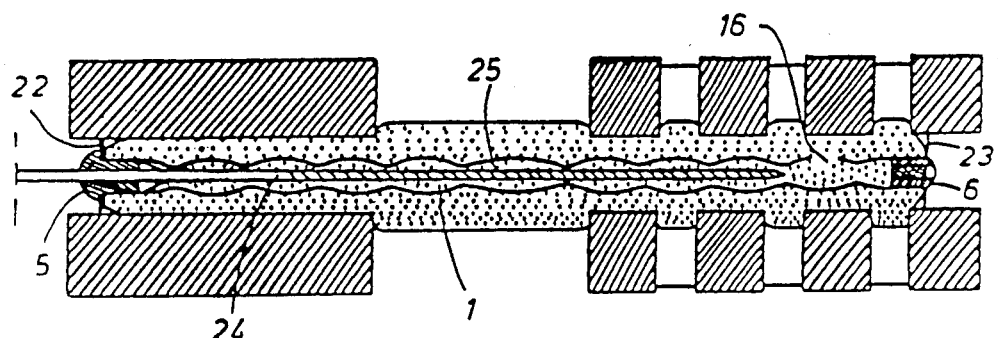
FIG. 7 is a longitudinal sectional view of a further embodiment of the use of the injection anchor of the present invention.

In a further embodiment according to FIG. 7, positioning gaskets 22, 23 are clamped between each rivet head of the fastener 5, 6 and the ends of the tube 1 the positioning gaskets 22, 23 being fitted to the diameter of the borehole 20 and guaranteeing a coaxial alignment of the tube 1. Further, a connecting post 24 is inserted or screwed into the tube 1 from the front end, the connecting post 24 having a non-smooth surface, e.g. an external screw thread 25, and having an end which protrudes out from the tube 1, which may be used according to various designs as a hook, eyelet, threaded rod, etc., for mounting of other elements.

Figure 8:
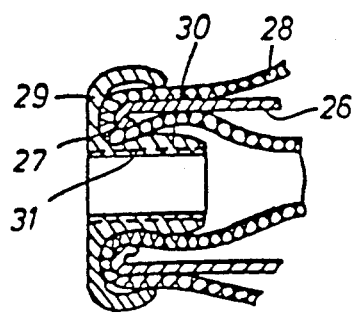
FIG. 8 is a sectional view of a further embodiment for a modified front end of the injection anchor.

In the embodiment according to FIG. 8, the tube 26 is provided on its front end with a rolled-in edge 27 and with a rivet-like fastener 29, for clamping a tucked-in hose 28, to the tube. The hose 28 includes a shaft with a widened portion inward from the rolled-in edge 27 which provides a high clamping pressure with the tube 26. The passage channel of the fastener 29 is provided with an inner screw thread 31 for attaching an extraction tool. When the injection anchor according to FIG. 8 is set in a borehole, its resistance to extraction may be tested, following a hardening period, by using an attached extraction tool to pull the fastener 29 out of the tube 26. If the extraction resistance of the anchor in the masonry is too small, the injection anchor will also be pulled out. By contrast, if only the fastener element 29 is extracted, the test confirms in a non-destructive manner that the injection anchor has sufficient extraction resistance.

Figure 9:
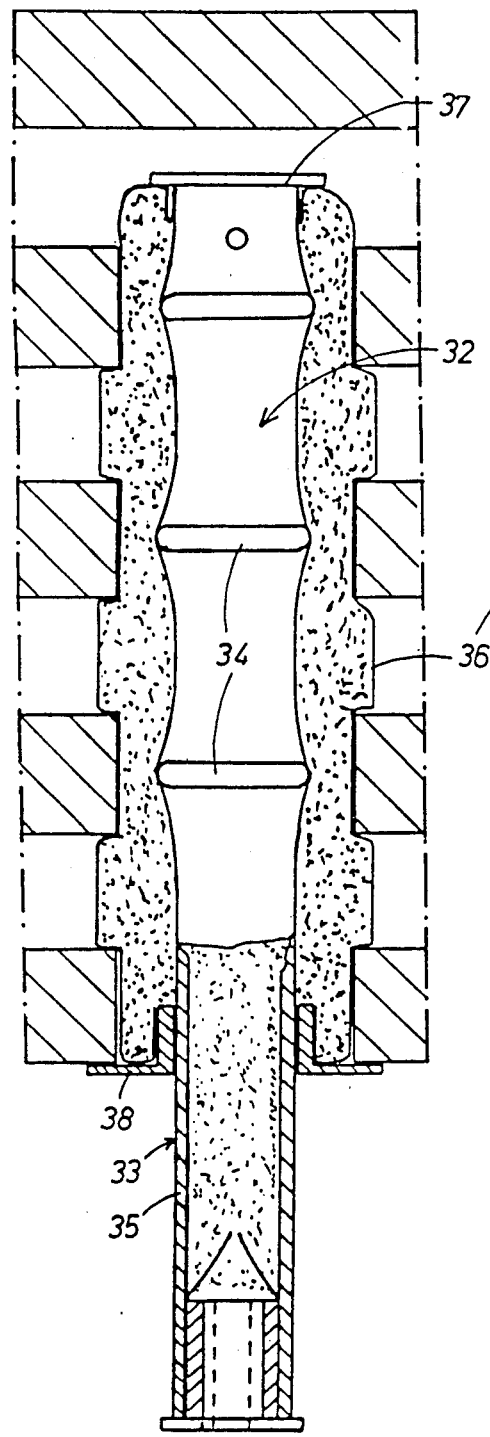
FIG. 9 is a longitudinal sectional view showing an alternative embodiment of the present invention in which the injection anchor protrudes from a borehole.
Figure 10:
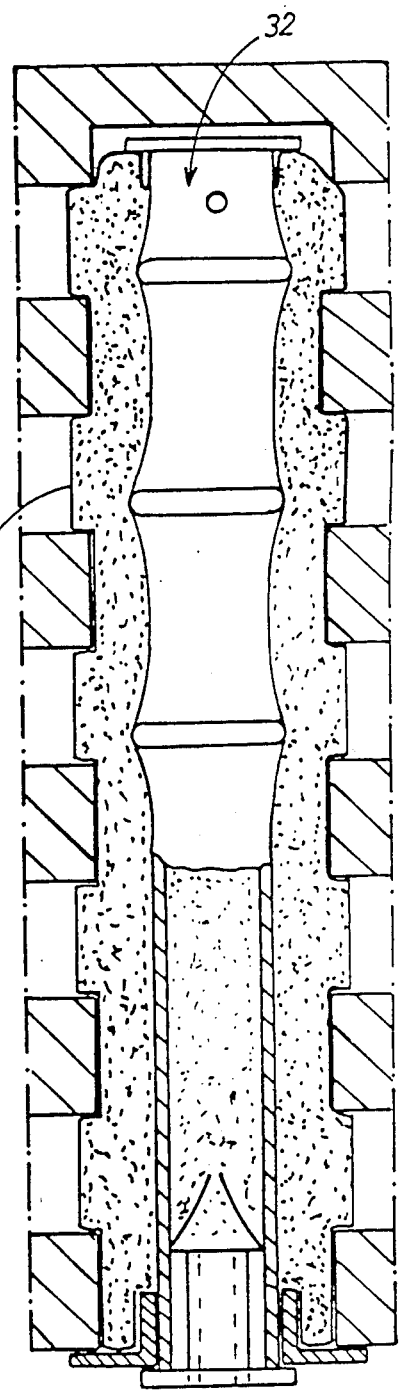
FIG. 10 is a longitudinal sectional view of the embodiment of FIG. 9 in which the injection anchor is completely inserted in the borehole.
Figure 12:
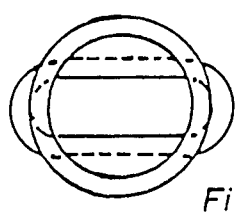
FIG. 12 is a cross-sectional view of the tube of FIG. 11.
Figure 14:
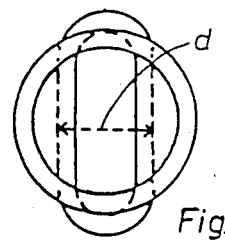
FIG. 14 is a cross-sectional view of the tube of FIG. 13.
Figure 11:
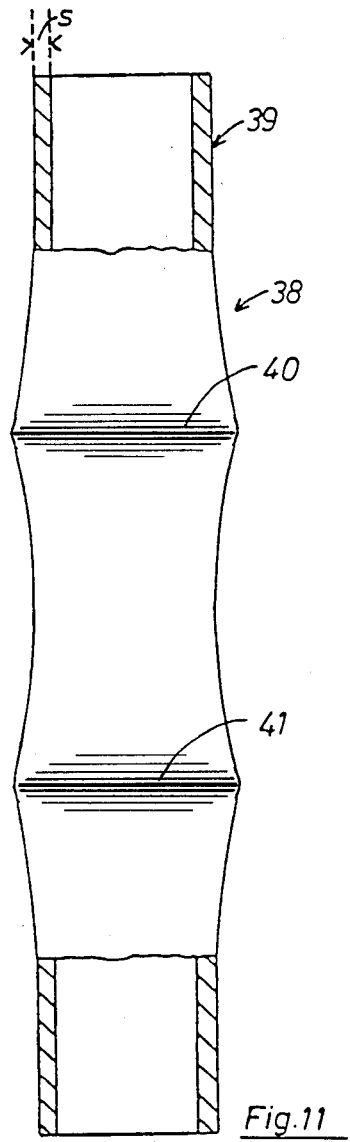
FIG. 11 is a plan view of a tube of the injection anchor of the present invention.
Figure 13:
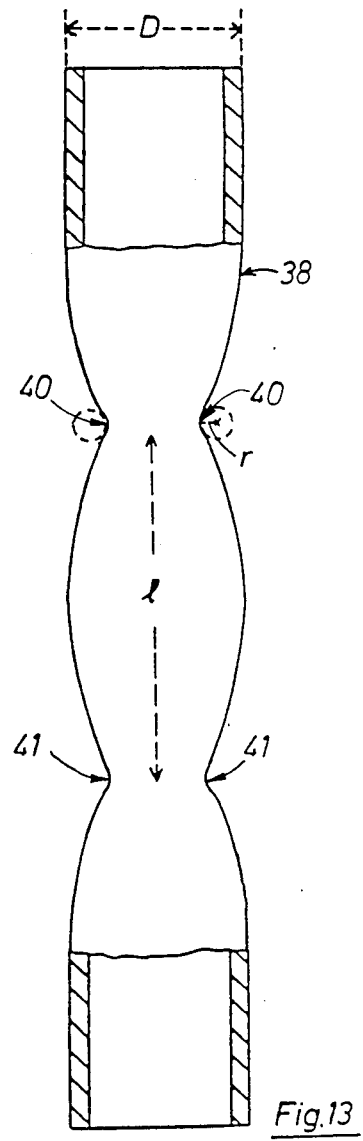
FIG. 13 is a plain view of the tube of FIG. 11, shown at a rotation of 90°.

FIGS. 9 and 10 show an alternative embodiment of the present invention, wherein, an injection anchor 32, has a tube 33 which is provided with indentations 34 aligned parallel to one another only along that portion of tube 33 which is inserted into a borehole, and with long segment 35. The tube is enclosed by an elastic hose 36 which is tightly fastened such as, for example, by glue or clamps, on the back end 37 of the tube. On its front end the hose 36 is tightly fastened to a ring flange 38 which is mounted in a longitudinally displaceable manner on the long segment 35. The hose 36 is not only radially, but also longitudinally elastic, and is shorter than the tube 33, as can be seen from FIG. 9. In FIG. 9 the injection anchor is only partially inserted into the borehole such that ring flange 38 touches the mouth of the borehole and long segment 35, protrudes some distance out from the borehole. FIG. 10 shows the same injection anchor as in FIG. 9, with the injection anchor completely inserted into a correspondingly deeper borehole, and where the longitudinally elastic hose 36 has been stretched out to the length of the tube 33.

FIGS. 11 through 14 show, a tube 39 adapted for use in injection anchors according to the present invention which is provided with two pairs each of diametrically opposed indentations 40, 40 and 41, 41 and showing the optimal geometric measurements. The radius of curvature r of the base of the indentations 40, 41 is approximately equal to the wall thickness s of the tube. This is obtained by using a pressure tool whose top curvature has this radius r.

The distance l between the two adjacent indentations 40, 41 is approximately twice the exterior diameter D of the tube. The tube is reduced in the area of the opposing indentations to a thickness d of approximately 55% of the tube diameter D.

I claim:

1. An injection anchor to be set in pre-drilled boreholes, comprising a tube which is closed at a rear end, and which is provided with at least one radial exit hole for injection material, and of an elastic jacket surrounding the tube, wherein the tube is provided with diametrically opposed, rounded-off indentations and has, with the exception of end segments alternately flat-oval cross-sectional areas and substantially round cross-sectional areas, and further wherein the elastic jacket is designed as a hose, which extends over the entire length of the tube, and includes ends which are tucked into the tube ends and clamped solidly to the tube by means of rivet-like fasteners.

2. An injection anchor according to claim 1, wherein in an area of the opposing indentations, the tube is reduced to about one-half the tube diameter and the tube is continuously undulated.

3. An injection anchor according to claim 1, wherein the rivet-like fasteners have a passage channel and wherein a locking piece is pressed into the rivet-like fastener at the rear end of the tube and acts as a closure member.

4. An injection anchor according to claim 1, wherein a large exit bore is provided near the rear end of the tube, and small exit holes are provided and distributed over the length of the tube.

5. An injection anchor according to claim 1, further comprising a connecting post, with a non-smooth surface inserted into the tube.

6. An injection anchor according to claim 1, further comprising a positioning gasket clamped between a rivet head of each rivet-like fastener and each end of the tube and which has a diameter designed to fit the diameter of the borehole.

7. An injection anchor according to claim 1, wherein the tube has a rolled-in edge on a front end, the rivet-like fastener at the front end of the tube is inserted into the tube with a high clamping force, and a shaft of the rivet-like fastener is provided with an inner threaded bore.

8. An injection anchor according to claim 1, wherein the radius of curvature of the base of the indentations is greater than or equal to the wall thickness of the tube and less than or equal to one-half the diameter of the tube.

9. An injection anchor according to claim 8, wherein the distance between adjacent indentations is 2 to 4 times the diameter of the tube.

10. An injection anchor according to claim 8, wherein the tube, in an area of the opposing indentations is reduced to a thickness of about 55% of the tube diameter.

11. An injection anchor according to claim 5, wherein the connecting post has an external screw thread.

* * * * *